United States Patent
Fieau et al.

(10) Patent No.: US 11,528,326 B2
(45) Date of Patent: Dec. 13, 2022

(54) METHOD OF ACTIVATING PROCESSES APPLIED TO A DATA SESSION

(71) Applicant: ORANGE, Issy-les-Moulineaux (FR)

(72) Inventors: Frederic Fieau, Chatillon (FR); Gael Fromentoux, Chatillon (FR); Arnaud Braud, Chatillon (FR)

(73) Assignee: ORANGE, Issy-les-Moulineaux (FR)

(*) Notice: Subject to any disclaimer, the term of this patent is extended or adjusted under 35 U.S.C. 154(b) by 0 days.

(21) Appl. No.: 16/624,617

(22) PCT Filed: Jun. 18, 2018

(86) PCT No.: PCT/FR2018/051452
§ 371 (c)(1),
(2) Date: Dec. 19, 2019

(87) PCT Pub. No.: WO2018/234675
PCT Pub. Date: Dec. 27, 2018

(65) Prior Publication Data
US 2020/0128083 A1   Apr. 23, 2020

(30) Foreign Application Priority Data

Jun. 21, 2017 (FR) ..................................... 1755654

(51) Int. Cl.
*G06F 13/00* (2006.01)
*H04L 67/14* (2022.01)
(Continued)

(52) U.S. Cl.
CPC .............. *H04L 67/14* (2013.01); *H04L 67/56* (2022.05); *H04L 69/164* (2013.01); *H04L 67/01* (2022.05)

(58) Field of Classification Search
CPC ....... H04L 67/14; H04L 67/28; H04L 69/164; H04L 67/42; H04L 67/20; H04L 67/2838; H04L 67/56; H04L 67/01
(Continued)

(56) References Cited

U.S. PATENT DOCUMENTS

| 7,792,913 B2* | 9/2010 | Chen | .................... G06Q 10/107 |
| | | | 709/206 |
| 8,010,793 B2* | 8/2011 | Hoshino | ........... H04L 29/12009 |
| | | | 713/168 |

(Continued)

FOREIGN PATENT DOCUMENTS

WO    2016173635 A1    11/2016

OTHER PUBLICATIONS

English translation of the Written Opinion of the International Searching Authority dated Sep. 3, 2018 for corresponding International Application No. PCT/FR2018/051452, filed Jun. 18, 2018.
(Continued)

*Primary Examiner* — Kenneth R Coulter
(74) *Attorney, Agent, or Firm* — David D. Brush; Westman, Champlin & Koehler, P.A.

(57) ABSTRACT

A method of activating at least one processing entity from among a plurality of entities situated on the path of a data of a session between a terminal of a user and a server of a services provider. The terminal and the server are attached to a communications network. In the method, the terminal: sends to the server an identification message to receive identifiers of entities of the plurality, which are added to the message by the entities; receive from the server an acknowledgement message including the identifiers included in the identification message; select at least one identifier from
(Continued)

among those received from the server; and send to the server a message relating to the activation of entities from among the plurality.

14 Claims, 6 Drawing Sheets

(51) Int. Cl.
  *H04L 69/164* (2022.01)
  *H04L 67/56* (2022.01)
  *H04L 67/01* (2022.01)
(58) Field of Classification Search
  USPC .......... 709/227–229, 203, 224; 718/102–105
  See application file for complete search history.

(56) References Cited

U.S. PATENT DOCUMENTS

| | | | | |
|---|---|---|---|---|
| 8,098,638 | B2* | 1/2012 | Spiess | H04W 4/029 |
| | | | | 370/338 |
| 8,205,074 | B2* | 6/2012 | Hoshino | H04L 65/1006 |
| | | | | 713/156 |
| 9,628,443 | B2* | 4/2017 | Roskind | H04L 63/029 |
| 10,159,041 | B2* | 12/2018 | Sakai | H04W 4/80 |
| 10,257,783 | B2* | 4/2019 | Qi | H04W 52/46 |
| 10,389,690 | B2* | 8/2019 | Nadas | H04L 63/0457 |
| 10,912,009 | B2* | 2/2021 | Labbe | H04W 8/005 |
| 11,088,942 | B2* | 8/2021 | Boucadair | H04L 12/2898 |
| 2006/0095768 | A1* | 5/2006 | Hoshino | H04L 29/12783 |
| | | | | 713/168 |
| 2006/0268770 | A1* | 11/2006 | Spiess | H04W 4/029 |
| | | | | 370/328 |
| 2009/0077181 | A1* | 3/2009 | Chen | G06Q 10/107 |
| | | | | 709/206 |
| 2013/0246684 | A1* | 9/2013 | Cohen | G06F 13/4282 |
| | | | | 710/316 |
| 2017/0111859 | A1* | 4/2017 | Sakai | H04W 52/0212 |
| 2017/0142653 | A1* | 5/2017 | Qi | H04W 52/0212 |
| 2017/0208033 | A1* | 7/2017 | Roskind | H04L 67/2814 |
| 2018/0109503 | A1* | 4/2018 | Nadas | H04L 63/0428 |
| 2018/0220355 | A1* | 8/2018 | Labbe | H04W 8/005 |
| 2019/0268764 | A1* | 8/2019 | Wei | H04W 12/04 |
| 2020/0099766 | A1* | 3/2020 | Fromentoux | H04L 67/2842 |
| 2020/0120015 | A1* | 4/2020 | Boucadair | H04L 12/66 |

OTHER PUBLICATIONS

J. Iyengar, Ed., "QUIC: A UDP-Based Multiplexed and Secure Transport draft-ietf-quic-transport-04", Jun. 13, 2017, https://tools.ietf.org/html/draft-ietf-quic-transport-04.
International Search Report dated Aug. 27, 2018 for corresponding International Application No. PCT/FR2018/051452, filed Jun. 18, 2018.
Written Opinion of the International Searching Authority dated Aug. 27, 2018 for corresponding International Application No. PCT/FR2018/051452, filed Jun. 18, 2018.

* cited by examiner

METHOD OF ACTIVATING PROCESSES APPLIED TO A DATA SESSION

CROSS-REFERENCE TO RELATED APPLICATIONS

This Application is a Section 371 National Stage Application of International Application No. PCT/FR2018/051452, filed Jun. 18, 2018, which is incorporated by reference in its entirety and published as WO 2018/234675 A1 on Dec. 27, 2018, not in English.

1. FIELD OF THE INVENTION

The invention lies in the field of the data sessions set up in communication infrastructures. It deals with process management techniques applied to the data sessions conveyed in the communication infrastructures.

2. STATE OF THE PRIOR ART

The protocols used by a terminal to communicate over IP (Internet Protocol) networks have become greatly diversified in recent years after a period in which there were few changes of note. The protocol stack, corresponding to the different communication protocols used at each layer (physical, link, network, transport, session, presentation, application) can vary from one session to another.

A session is set up between two terminals for an exchange of data for a defined time period. The setting up of a session between two terminals requires the terminals to be previously attached to a communication network. A session, in the IP (Internet Protocol) networks, is based on a variety of protocols from the transport layer to the application layer of the OSI (Open Systems Interconnection) model. Multiple sessions, simultaneous or not, can be set up between two terminals. A single session between two terminals is sufficient to consider the terminals to be connected. For this reason, a session can be likened to a communication. A session is used for the exchange of data transported more often than not in packets. The terms data session or data packet session can therefore be used. A session can be one-way, from a terminal to a server, or two-way from a terminal to a server and from the server to the terminal.

Figure 1:
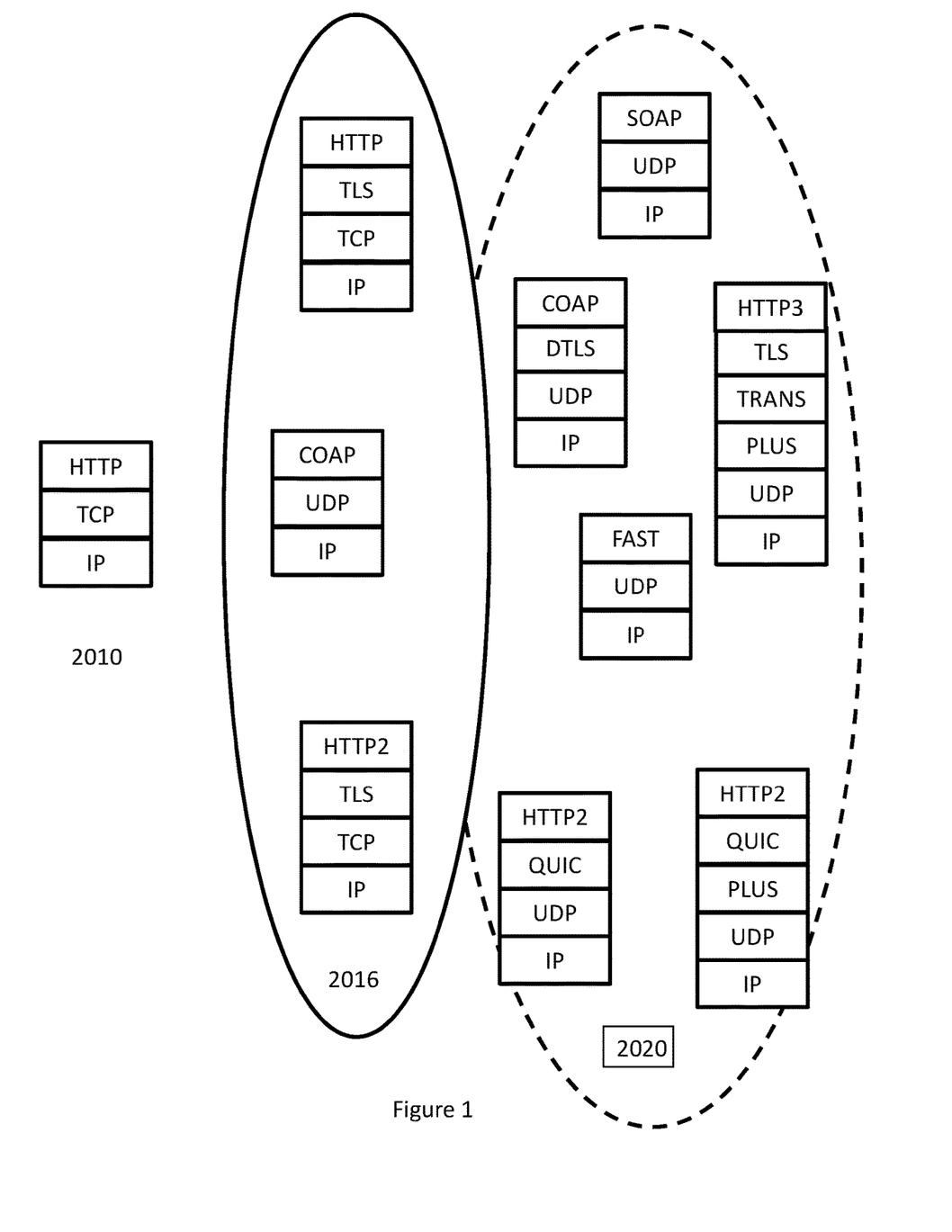
FIG. 1 presents a simplified view of the evolution of the communication protocols.

The development of the securing of the exchanges has also resulted in a wider variety of the protocols used for the sessions, bearing in mind that secured versions of the protocols used hitherto have been developed. These new protocols are often offered by the content providers, also providers of terminals and/or of operating systems, who can more easily introduce new protocols since they control both the client terminal and the content servers. The development of new protocols by the content providers and more generally for the sessions is especially confirmed as it concerns protocols involved from the transport layer to the application layer, that is to say to ensure the communication from end to end. These new protocols are developed on the one hand to adapt to the context of the networks conveying the data of the sessions and in particular improve the setting up of the sessions, that is to say the initialization of the exchanges of data of the sessions, and the quality of experience for the users. Thus, alongside the historical protocols, namely HTTP (HyperText Transfer Protocol) over TCP (Transport Control Protocol) or UDP (User Datagram Protocol)) over IP (Internet Protocol), application layer encryption protocols, namely TLS (Transport Layer Security) or DTLS (Datagram Transport Layer Security) can be used. At the application level, it is now possible to use the HTTP/2 protocol and it is also possible to use the QUIC (Quick UDP Internet Connections) protocol as transport protocol. These are only a few examples of the new protocols used for the terminal nodes to communicate over the IP networks. FIG. 1 illustrates the diversity of the different protocols that can be implemented in a communication network. The protocols indicated in FIG. 1 are given by way of example and the protocols deployed are not limited to those of FIG. 1. These changes of protocols do not take account of the infrastructures transporting the session data even though a potentially significant number of so-called intermediate functions, that is to say functions deployed on the communication network between the terminal and the server, apply processes to the sessions by adding information to the packets transporting the data of the sessions, by using information from the packets or by modifying the data present in the packets.

The operators responsible for routing session data and more globally the entities involved in the setting up and the management of these sessions have in fact increasingly deployed devices responsible for specific processes on the session data. These processes can consist in improving the routing, in compressing the data, in storing information relating to the sessions, in adapting a coding, in applying a quality of service to the packets relating to the data. These different processes are applied by the entities placed on the path taken by the data of the sessions set up between a user terminal and an application. These processes are also applied by the entities without the user, even the services provider managing the server providing the data required by the user via a terminal, giving their consent to the application of the processes, nor even them being informed thereof. The means for informing and collecting the authorizations from the end entities, namely the terminal and the server, of a session with respect to these processes are not provided, either in the changes to the protocols used for the sessions or in new protocols which could be implemented to ensure this objective of approval by an end entity on processes ensured by intermediate entities or by the other end entity.

The object of the present invention is to remedy these drawbacks.

3. SUMMARY OF THE INVENTION

The invention improves the situation using a method for activating at least one processing entity from among a plurality of entities situated on the path of the data of a session between a terminal of a user and a server of a services provider, the terminal and the server being attached to a communication network, implemented in said terminal and comprising
- a step of transmission to the server of an identification message intended to receive identifiers of entities of the plurality added by the entities,
- a step of reception from the server of an acknowledgement message comprising identifiers included in the identification message,
- a step of selection of at least one identifier from among those received from the server,
- a step of transmission to the server of a message relating to the activation of entities from among the plurality.

The packets of the data sessions between a terminal and a server have different processes applied to them in their transit through the communication network. These processes can be ensured by distinct entities and, in the prior art, are applied without the terminal or the server having any knowledge thereof and, all the more so, without them giving an agreement for these processes to be applied or not.

When a session is set up between a terminal and a server or on a session already set up, the processing entities are identified by the addition of an identifier for each entity applying a process or likely to apply a process to the packets of a session. Thus, the server receiving the data of the session can identify all the entities present on the path between the source and the server. Neither the terminal nor the server in fact know in principle what processes are applied to a given session and this identification phase is necessary. It corresponds to an operation of discovery of the entities. Among the entities present on the path, some have received an approval from the provider responsible for the server, for example in an operation prior to the setting up of the session, and others not. The server transmits in an acknowledgement message identifiers of intermediate entities identified on the path. By default, it can return all the identifiers received in the identification message or only some of them.

In the case where it returns all the identifiers to the terminal, the terminal has information on the intermediate entities on the path, as communicated by the server, and uses this information for the activation method or for other methods, such as, for example, the selection of a path, if it receives information from distinct servers, implemented by different providers, for one and the same service.

The terminal, in the activation method, transmits an activation message enabling each entity to know if it can or cannot apply the process for the subsequent packets of the data session. The terminal, by virtue of this activation message, applies a policy to the packets of the data session.

The terminal can in fact thus transmit the packets of the session by having the guarantee that only the entities authorized by itself apply a process, the terminal having possibly retained a subset of the entities from among the intermediate entities that the server will have communicated to it.

The services provider can equally be a provider hosting data or an intermediate provider temporarily storing data such as a supplier of CDN (Content Delivery Network) services or a provider of data stored in cache servers. The services provider can also be a host of data of an enterprise network.

According to one aspect of the invention, in the activation method, the acknowledgement message comprises identifiers of entities of the plurality approved by the provider.

By virtue of agreements established prior to the session or if the function is implemented by the same entity as the entity responsible for the server, or even if it concerns a process necessary to the setting up of the session, the server indicates to the terminal the entities that it approves from among the identified processing entities. In this case, the server transmits to the terminal only the identifiers of approved entities and the activation method makes it possible to activate only functions selected by the terminal but also by the server. The sending of the identifiers approved by the services provider corresponds to a consent for certain processing entities, on the path between the terminal and the server. This consent can be used by the terminal to itself approve or not the presence of some of these functions on the path and, consecutively, the processes applied to the packets of the session.

The server therefore selects a subset of the entities identified from the identification message transmitted by the terminal and complemented by the intermediate entities.

According to another aspect of the invention, in the activation method, the message relating to the activation comprises information for deactivating entities whose identifiers are not selected by the terminal.

Processing entities, when the method is implemented, possibly now perform processes on the first data exchanged, before implementing the method. The deactivation of certain entities makes it possible to indicate to them to stop their process and therefore retain on the path only the processing entities selected by the terminal and the server. The presence of deactivation information in the message relating to the activation indicates to the entities concerned that they must cease their process.

According to another aspect of the invention, in the activation method, the message relating to the activation comprises information for activating entities whose identifiers are selected by the terminal.

The method, when it is implemented on initialization of a session, that is to say before any datum relating to the session is transmitted by the terminal, makes it possible to indicate to the selected entities that they must perform their process on the data of the session. Since no entity has been activated before the setting up of the session and, consecutively, before the method is effectively implemented, the message relating to the activation makes it possible in this case to activate only the selected entities.

According to another aspect of the invention, in the activation method, the identification message and the message relating to the activation are messages relating to the QUIC protocol.

The QUIC (Quick UDP IP Connections) protocol is positioned among the protocols most widely considered in the communication networks. It is based on the UDP (User Datagram Protocol) and it can be considered that it represents an alternative to TCP (Transport Control Protocol) even though the features of the two protocols are not identical. The QUIC protocol offers an increasing benefit for the providers of applications because it incorporates encryption features as well as functions relating to quality of service, notably by virtue of the possibilities for multiplexed connections between two QUIC parties. The use of this protocol for the exchanges between the terminal and the server, in order to identify and activate the processing entities, is advantageous because it makes it possible to combine the intrinsic functions of the protocol that are notably security, reliability and availability with new services such as the discovery and the certification of processing entities on a path between a terminal and a server for a given session.

According to another aspect of the invention, in the activation method, the identification message and the message relating to the activation also comprise a session identifier.

A processing entity can possibly apply processes for different data sessions involving at least one same end (terminal or server) or data sessions between ends completely distinct from those for which the activation method is implemented. Since the object of the activation message is to indicate to the processing entities whether or not they have to apply a process for a session, it is advantageous to add session information to the data packets to allow each processing entity to quickly identify the session concerned from the session identifier and to apply or not apply the process to these packets, with respect to the activation information present. In the case where the QUIC protocol is used for the transmission of these messages, the connection identifier can be the Connection ID identifier as defined in https://tools.ietf.org/html/draft-ietf-quic-transport-04 (June 2017). The session identifier in an identification message also allows the processing entities to associate the required identification with a given session and thus, for example, detect messages having identical session numbers but a different origin and/or destination, which is not a priori possible.

The different aspects of the activation method which have just been described can be implemented independently of one another or in combination with one another.

The invention relates also to a method for acknowledging identification of at least one processing entity from among a plurality of entities situated on the path of the data of a session between a terminal of a user and a server of a services provider, the terminal and the server being attached to a communication network, implemented in said server and comprising
- a step of reception from the terminal of an identification message comprising identifiers of entities of the plurality added by these entities,
- a step of transmission to the terminal of an acknowledgement message comprising identifiers included in the identification message,
- a step of reception from the terminal of a message relating to the activation of entities from among the plurality.

The acknowledgement method allows a server, once the processing entities are identified for a session, to be able to acknowledge entities present on the path between the terminal and the server managed by the services provider. This advantageously makes it possible to be able to transmit to the terminal the identifiers of the processing entities intervening or potentially intervening, in the case where the session is not set up, on the data of the session. The sending to the terminal of identifiers of the entities then allows the latter to select entities from the identifiers received from the server. The terminal finally decides on the intermediate entities that it wants to authorize for the session from among the entities received from the server with which the terminal has set up or will set up a session.

According to one aspect of the invention, the acknowledgement method further comprises a step of selection of the identifiers of the entities approved by the provider from among the identifiers received in the identification message.

The server can intervene in the selection of the intermediate entities on the path of the data of the session by selecting only the entities that it has approved. Once it has received the identifiers of the entities present on the path, the server extracts the identifiers of entities with which an approval exists, and transmits only to the terminal those identifiers extracted from the set of identifiers received in the identification message.

According to one aspect of the invention, the acknowledgement method further comprises
- a step of transmission of an approval request message to at least one entity of the plurality,
- a step of reception of an approval response message, from the at least one entity, comprising the public key of the entity.

Messages relating to the approval between the server and the processing entities can advantageously be exchanged between the server and the processing entities so that the server holds a list of processing entities as well as the public keys of those entities. Knowing that a large number of entities are likely to be deployed in the communication networks, by various operators or services providers, the server will be able to perform a discovery of the different functions prior to the exchange of approval messages. An alternative is for agreements between the services provider and the managers of the processing entities to be established so that the server solicits only the processing entities administered by managers with which an agreement exists. The exchange of the messages relating to the approval can take place in a way that is uncorrelated with the messages relating to a given session, since an approval is not specific to a given session.

The different aspects of the acknowledgement method which have just been described can be implemented independently of one another or in combination with one another.

The invention relates also to a device for activating at least one processing entity from among a plurality of entities situated on the path of the data of a session between a terminal of a user and a server of a services provider, the terminal and the server being attached to a communication network, implemented in said terminal and comprising
- a transmitter, capable of transmitting to the server an identification message intended to receive identifiers of entities of the plurality added by the entities,
- a receiver, capable of receiving from the server an acknowledgement message comprising identifiers included in the identification message,
- a selection module, capable of selecting at least one identifier from among those received from the server,
- the transmitter, also capable of transmitting to the server a message relating to the activation of entities from among the plurality.

This device, capable of implementing in all its embodiments the activation method which has just been described, is intended to be implemented in a terminal.

The invention relates also to a device for acknowledging identification of at least one processing entity from among a plurality of entities situated on the path of the data of a session between a terminal of a user and a server of a services provider, the terminal and the server being attached to a communication network, implemented in said server and comprising
- a receiver, capable of receiving from the terminal an identification message comprising identifiers of entities of the plurality added by these entities,
- a transmitter, capable of transmitting to the terminal an acknowledgement message comprising identifiers included in the identification message,
- the receiver, being also capable of receiving from the terminal a message relating to the activation of entities from among the plurality.

According to one aspect of the invention, the acknowledgement device further comprises a selection module, capable of selecting identifiers of the entities approved by the provider from among the identifiers received in the identification message.

According to another aspect of the invention, the acknowledgement device further comprises
- the transmitter, also capable of transmitting an approval request message to at least one entity of the plurality,
- the receiver, also capable of receiving an approval response message, from the at least one entity, comprising the public key of the entity.

This acknowledgement device, capable of implementing in all its embodiments the acknowledgement method which has just been described, is intended to be implemented in a data server.

The invention relates also to a system for activating at least one intermediate function, comprising
- a terminal comprising an activation device,
- a server comprising an acknowledgement device,
- at least one processing entity capable of adding an identifier to the identification message received from the terminal, capable of activating a process relating to the message relating to the activation.

The invention relates also to a computer program comprising instructions for the implementation of the steps of the activation method which has just been described, when this program is executed by a processor.

The invention relates also to a computer program comprising instructions for the implementation of the steps of the acknowledgement method which has just been described, when this program is executed by a processor.

These programs can use any programming language, and be in the form of source code, object code, or of intermediate code between source code and object code, such as in a partially compiled form, or in any other desirable form.

The invention also targets an information medium that can be read by a computer, and comprising instructions of the computer programs as mentioned above.

The information medium can be any entity or device capable of storing the programs. For example, the medium can comprise a storage means, such as a ROM, for example a CD ROM or a microelectronic circuit ROM, or even a magnetic storage means, for example a diskette (floppy disk) or a hard disk.

Also, the information medium can be a transmissible medium such as an electrical or optical signal, which can be routed via an electrical or optical cable, wirelessly or by other means. The program according to the invention can in particular be downloaded over a network of Internet type.

Alternatively, the information medium can be an integrated circuit in which the program is incorporated, the circuit being adapted to execute or to be used in the execution of the method concerned.

4. PRESENTATION OF THE FIGURES

Other advantages and features of the invention will become more clearly apparent on reading the following description of particular embodiments of the invention, given as simple illustrative and nonlimiting examples, and the attached drawings, in which.

5. DETAILED DESCRIPTION OF AT LEAST ONE EMBODIMENT OF THE INVENTION

Hereinafter in the description, examples of several embodiments of the invention in a communication network are presented. The invention can without preference be implemented in a fixed or mobile communication network.

Figure 2:
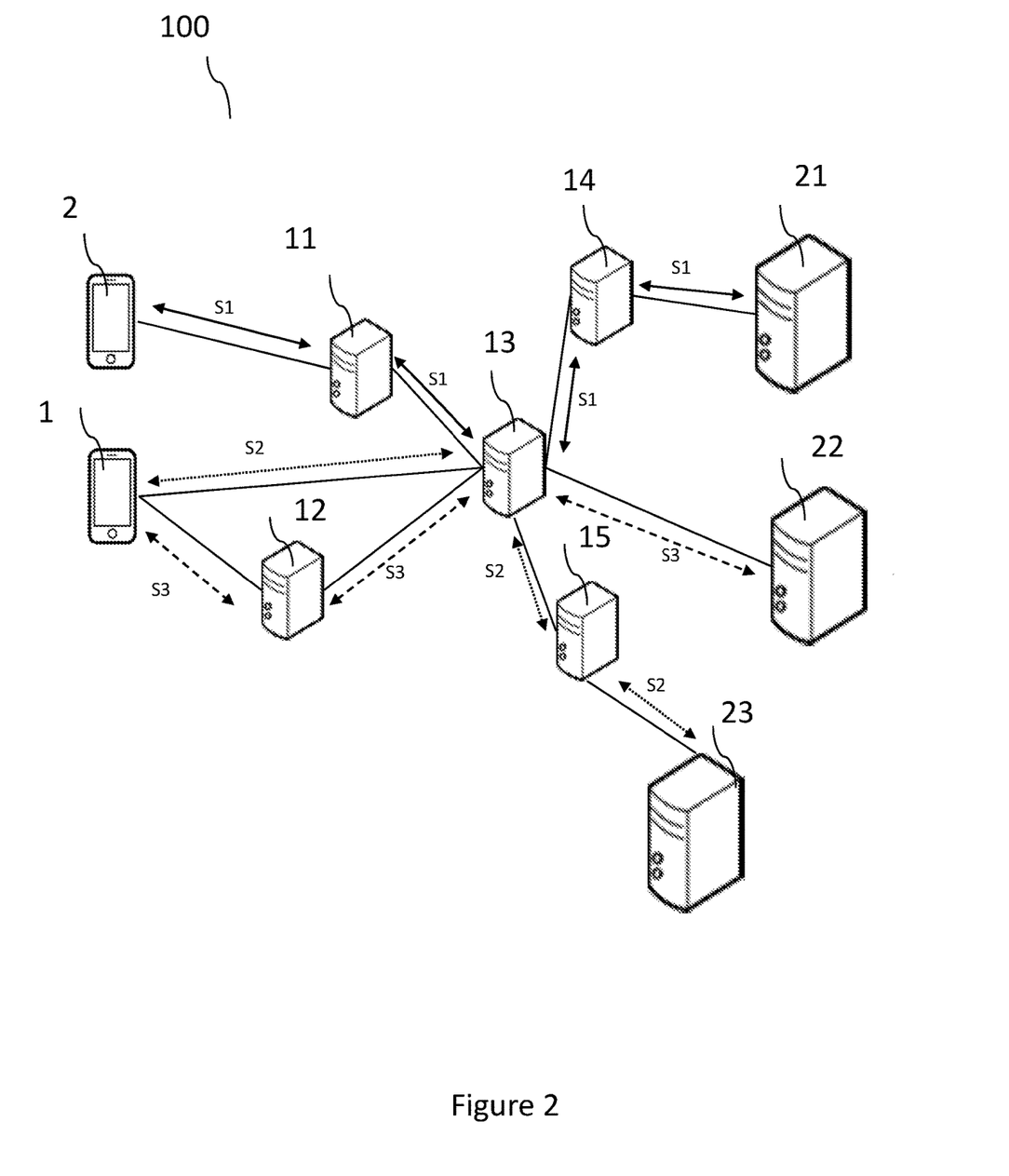
FIG. 2 presents a communication infrastructure according to an aspect of the invention.

Reference is made first to FIG. 2 which presents a communication network according to one aspect of the invention.

The terminals 1,2 and the servers 21, 22, 23 are connected to the communication network 100. The terminals 1, 2 can be fixed or mobile terminals and the servers 21, 22, 23 can be HTTP (HyperText Transfer Protocol), FTP (File Transfer Protocol) servers, cache or CDN (Content Delivery Networks) servers or any other type of device storing data available for terminals. The communication network 100 can be a fixed or mobile infrastructure, intended to route data for clients belonging to enterprises or so-called residential clients. The network 100 can be composed of several subnetworks, for example an access subnetwork and a core subnetwork. The network 100 can be administered by one or more distinct entities.

In the network 100, the terminal 2 sets up a communication session S1 with the server 21. This data session S1 can be one-way, from the terminal 2 to the server 21, or two-way, from the terminal 2 to the server 21 and from the server 21 to the terminal 2. The session S1 takes a path on which processing entities 11, 13, 14 are deployed. These processing entities 11, 13, 14 can be administered by one and the same manager or distinct managers. These processing entities, also called intermediate functions, can be deployed in specific or non-specific equipment, or even instantiated in a virtualized architecture. A processing entity can notably be a virtualized network function (VNF (Virtual Network Function)). The processes applied by these functions can vary. Thus, the object of some is to improve the routing of the packets of the data session S1, others ensure a mission relating to security, others come under the jurisdiction of legal obligations and others relate to the quality of service with respect to the routing of the packets. There is no limit on the number of processing entities involved for a session. In the mobile networks, for example, many processing entities are involved between the access gateway and the device interconnecting the mobile infrastructure and the Internet.

The terminal sessions can transit through distinct processing entities. Thus, distinct processing entities can be involved on sessions as a function for example of the service for which a session is set up, of the terminal, of the server, of the communication network, of the number of sessions routed by the communication network. The terminal 1 sets up two sessions S2 and S3. The data of the session S2, set up with the server 23, are processed by the processing entities 13 and 15 in their routing to the server 23 whereas the data of the session S3, set up by the terminal 1 with the server 22, are processed by the processing entities 12 and 13 before arriving at their destination, namely the server 22. In the case of two-way sessions, the data of the sessions from a server to a terminal, for example from the server 22 to the terminal 1, will be able to take the same path as the data transmitted by the terminals, in which case a mechanism, for example based on routing attributes, will have to be implemented in addition to the invention. In the case where the paths taken by the data in each direction are different, different processing entities can be envisaged.

Figure 3:
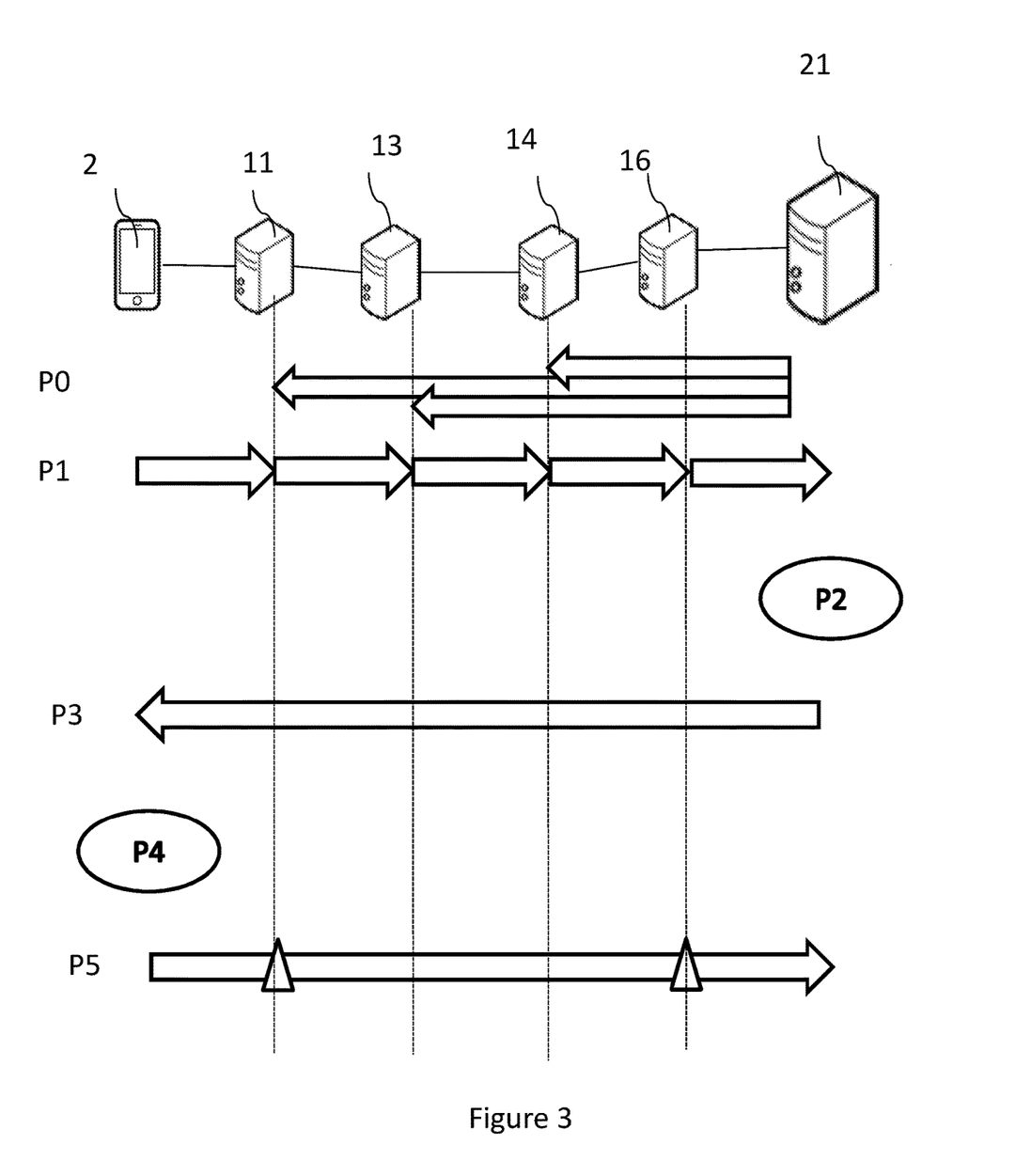
FIG. 3 presents an overview of the activation method according to a first embodiment of the invention.

In relation to FIG. 3, an overview of the activation method according to a first embodiment of the invention is presented. This embodiment is said to be generic and notably does not specify the protocol used for the transmission of the messages.

A session is set up or being set up between the terminal 2 and the server 21. If the session is set up, data of the session have already been exchanged between the terminal and the session when putting the method in place. If the session is being set up, no datum of the session has been exchanged between the terminal and the server in the implementing of the method. Neither the terminal 2 nor the server 21 know at this moment what processes are or will be applied to the data of the session.

In a phase P0, the server 21 puts in place an approval process with certain processing entities. More specifically, the server 21 solicits, through an exchange of approval messages, the processing entities 11, 14, 16 to agree that these processing entities can apply a process to the data intended for the server 21. The entities 11, 13, 14 are thus considered to be approved by the server 21. This approval can for example consist in an exchange of keys to decrypt messages exchanged between the entity and the server and/or by the exchange of identifiers. For aspects relating to the security of the data, the exchange of keys is recommended. The entities 11, 13, 14 can thus provide their public keys to the server 21. It is considered in this example that the entity 16 does not establish any approval with the server 21. The server 21 solicits the entities 11, 13, 14 because, possibly, an agreement exists between the services provider administering the server 21 and the operators responsible for managing the entities 11, 13, 14. The server 21 can, according to one alternative, solicit them following the implementation of a mechanism, not described, of discovery by the server 21 of the processing entities performed prior to the phase P0.

In the phase P1, the terminal 2 transmits a message to the server 21. This message, taking the path of data of the session between the terminal 2 and the server 21, transits through the process entities 11, 13, 14, 16 situated on the path. Each of these entities, placed on the path, performs a processing on the data of the session. It is considered, according to an alternative, that the entity 11 extracts information from the packets and corresponds for example to a DPI (Deep Packet Inspection) function performed by the operator providing the connectivity to the terminal 2. The entity 13, managed by another operator, transmits data of the session to an entity performing traffic analyses. The entity 14 performs a process of enrichment of the data of the session. The entity 16 performs a translation of the IP (Internet Protocol) addresses present in the headers of the data packets. On reception of the message transmitted by the terminal 2, each entity 11, 13, 14, 16 in succession adds an identifier which is specific to it, for example its IP address or information such as the domain name or any other type of identifier, to the message. The message or the identifier, according to one alternative, can be encrypted by an intermediate entity to prevent another entity on the path, or a device which might obtain the message, from being able to exploit transmitted information relating to the transmitted identifier. The intermediate entity can encrypt the information relating to its identification by using, for example, its private key, and the server will be able to decrypt the encrypted information, on reception of the message, by using its public key, for example obtained in the phase P0. When it receives the message transmitted by the terminal 2 and processed by the entities 11, 13, 14, 16, the server 21 can extract all of the identifiers added by the different entities on the path taken by the data of the session. It should be noted that processing entities may be on the path taken by the data but they may not add their identifier, the consequence of which is that they are not considered either by the server 21 or by the terminal 2 in the course of the steps of the method. Depending on the implementation of the activation method, they may nevertheless be impacted by the activation taking place in phase P5.

In the phase P2, according to one alternative, the server 21 selects from among the received identifiers the identifiers of entities corresponding to entities approved by the server 21 or the services provider responsible for this server 21 in the phase P0. The server 21 selects the entities 11, 13, 14 present on the path and does not select the entity 16, which is not approved by the server 21. If the phase P0 consists in an exchange of identifiers, then the server 21 performs a comparison of the identifiers received in the message transmitted by the terminal 2 in the phase P1 with the identifiers corresponding to entities with which an approval is concluded in the phase P0 and selects only the identifiers of the approved entities from among the identifiers received in the phase P1. In order to conduct this selection, the server 21 can maintain a database that is local or external to the server, comprising the identifiers of the approved entities. If the approval is implemented securely, then the processing entity can encrypt the added data with its private key, reinforcing the confidentiality with respect to the other processing entities on the path and the authenticity of the transmitted identifier. The server 21 can decrypt the identifiers by using the corresponding public key. The encryption by an intermediate entity 11, 13, 14, 16 of the identifier that it adds to the identification message in its transit and intended for the server 21 makes it possible not only to unambiguously identify a processing entity 11, 13, 14, 16 but also to be able to check that the processing entity 11, 13, 14 effectively corresponds to an entity for which an approval has previously been established between the server 21 and the processing entity 11, 13, 14. The use of the private key to encrypt the identifier, in the case where it is also used by the entities 11, 13, 14 for the activation, can also allow the server 21 to ensure that the processing entity 11, 13, 14 that has been activated using the activation message is indeed a processing entity 11, 13, 14 with which an approval has been concluded with the server 21.

According to another alternative, the server 21 does not perform any selection of intermediate entities. It receives the identifiers in the phase P1 but does not, in the phase P2, perform any selection of identifiers from among those received. The phase P2, in this case, is used only to collect the identifiers.

In the case where the server does not perform any selection in the phase P2, in the phase P3, the server 21 transits to the terminal 2 the identifiers of the entities 11, 13, 14, 16 received in an identification message, allowing the terminal 2 to have knowledge of the entities actually present on the path taken by the session data between the terminal 2 and the server 21.

According to one alternative, the server 21 transmits to the terminal 2 only the intermediate entities approved by the server 21. The server 21 thus transmits the identifiers of the entities 11, 14, 16 to the terminal 2. This alternative is considered in the subsequent exchanges. The server 21 transmits this information to the terminal 2 in response to the message received from the terminal 2 in the phase P2, but this message can use a different path, even a different protocol, from that used by the message sent by the terminal 2.

According to one alternative, the server 21 can attach a certificate guaranteeing its identity to the acknowledgement message transmitted to the terminal 2. The presence of a certificate from the services provider in the acknowledgement message received by the terminal 2 makes it possible to guarantee that the message effectively originates from this services provider. It can also be transmitted by the terminal 2 in the activation message to inform the selected processing entities 11, 14 that the services provider has authorized, just like the terminal 2, the activation of the processes performed by the entities 11, 14. In the case where the process ensured by the entity relates to the server 21, for example if it involves collecting and storing data intended for the server 21, the authorization of the services provider revealed by the presence of the certificate can be used by the processing entity 11, 14.

In the phase P4, the terminal 2 selects entities from the identifiers received from the server 21 in the phase P3. Since the terminal 2 has received the identifiers of the entities 11, 14, 16, it must then decide which identifiers and therefore which entities it wants to activate for the transfer of the data of the session. In the case where the identifier is explicit, for example a character string, this information can be used by the user to decide whether or not to activate. Thus, an identifier of Middlebox_operator A or Middlebox_operator B type can more easily be used by the user than a character string that is in principle meaningless to the user. Thus, the user can intervene in the selection of the identifiers and consequently of the processing entities on the session.

In the phase P5, the terminal 2 transmits to the server 21 a message relating to the activation of the entities that it has selected in the phase P4. The activation can consist in having an entity execute a task for which it is deployed. A device of firewall type executes a filtering function if it is activated, a processing entity DPI executes a stream identification function if it is activated, an enriching entity adds enrichment data when it is activated. The deactivation of a process consists in not executing the corresponding actions. If one entity ensures several processes, additional information indicating the process concerned is added to the activation message. The message, according to one alternative, contains the identifiers of the intermediate entities selected by the terminal. An intermediate entity whose identifier is in the message, applies its process to the data of the session. If the identifier of an entity is not in the message, then the entity deactivates the process performed. According to another alternative, the entities whose identifiers are in the message deactivate the process of the data of the session or do not start it if the session is not initialized while the entities whose identifier is not present continue their process on the data of the session or start the process if the session is not initialized. In the embodiment presented, the message relating to the activation indicates to the entities 11 and 16 on the path of the data of the session set up with 21 to activate their process.

Figure 4:
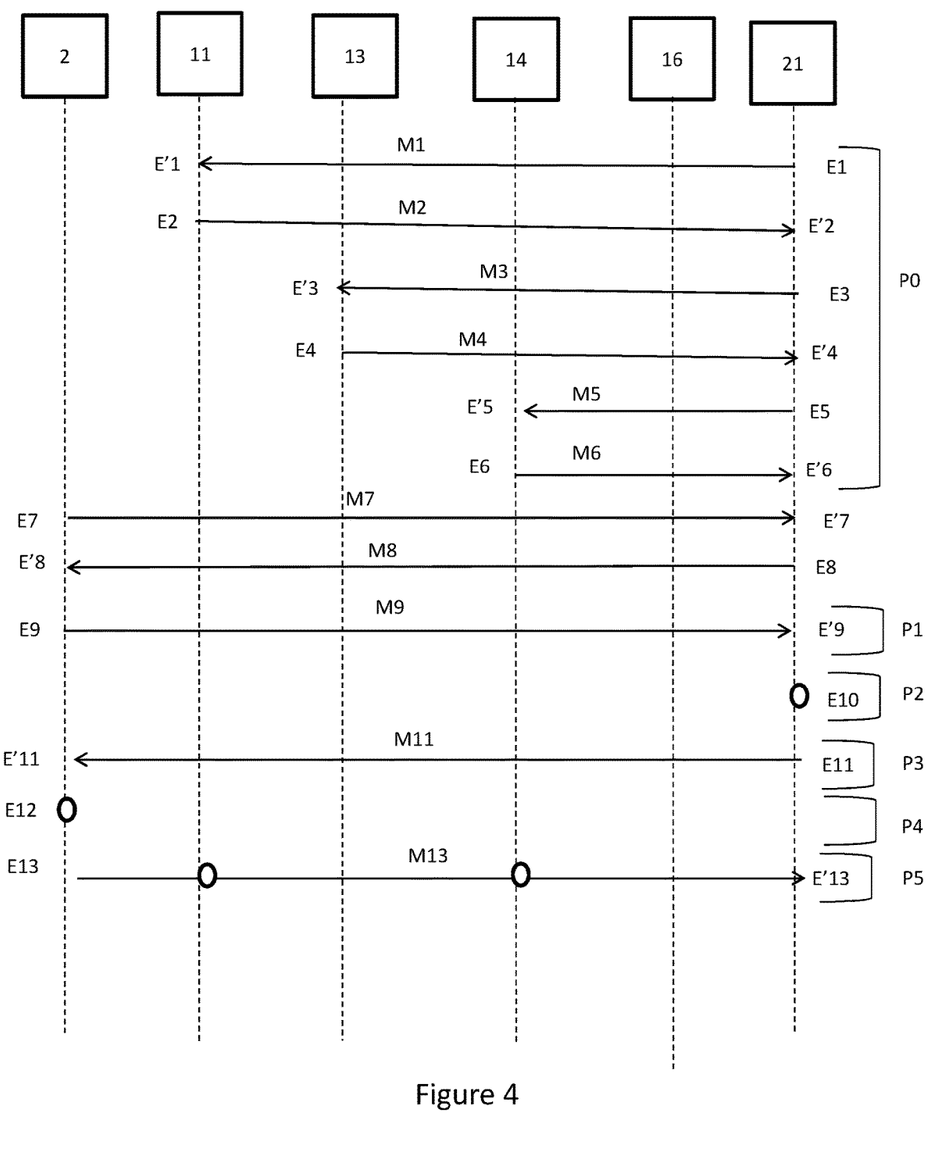
FIG. 4 presents an overview of the steps of the activation method according to a second embodiment of the invention.

Reference is now made to FIG. 4 which presents an overview of the steps of the activation method according to a second embodiment of the invention. In this embodiment, the session between the terminal 2 and the server 21 is not set up and the method takes place before session data are transmitted by the terminal to the server. The messages in this embodiment are transmitted by using the QUIC protocol. The phases of the method, as presented in FIG. 3, are recalled in this figure which describes the messages exchanged between the terminal 2, the server 21 and the entities 11, 13, 14, 16.

In the phase P0, the following exchanges take place.

In the step E1, the server 21 transmits to the entity 11 a message M1 of "HTTP Get" type that the entity 11 receives in the step E'1.

In response, in the step E2, the entity 11 transmits to the server 21 a message M2 of 200 OK type comprising a public key of the entity 11 and an identifier, such as the IP address used by the entity 11. The server 21 receives this message in the step E'2.

The steps E3, E'3, E4, E'4 on the one hand and E5, E'5, E6, E'6 on the other hand are respectively identical to the steps E1, E'1, E2, E'2 except that they respectively involve the entities 13 and 14 and not the entity 11. Correspondingly, the messages M3 and M4 on the one hand and the messages M5 and M6 on the other hand are respectively identical to the messages M1 and M2.

At the end of the phase P0, the server 21 holds public keys and the IP addresses of the entities 11, 13 and 14, formalizing the approval of these entities with the server 21 in this embodiment.

In the step E7, the terminal 2 transmits a message M7 of QUIC Client Hello type to the server 21 which receives it in the step E'7.

In the step E8, the server 21 transmits a message M8 of QUIC server Hello type to the terminal 2 which receives it in the step E'8.

The object of these messages is to negotiate parameters, notably securing parameters, relating to the setting up of a session between the terminal 2 and the server 21.

In the step E9, corresponding to the phase P1, the terminal 2 transmits a message M9 of QUIC SIG type to the server 21 in order to identify the entities on the path taken by the data of the session between the terminal 2 and the server 21. The entities 11, 13, 14, 16 add an identifier to the QUIC SIG message when they receive the message M9. When an entity retransmits the message M9, the message contains new information corresponding to its IP address. The entities add their IP address to the QUIC SIG message received from the terminal 2 and intended for the server 21. The server 21 receives the QUIC SIG message comprising notably the IP addresses of the entities 11, 13, 14, 16 in the step E'9.

In the step E10, corresponding to the phase P2, the server 21 identifies, from the IP addresses, the entities with which an approval has been concluded in the phase P0 and selects the entities 11, 13 and 14.

The server 21, in the step E11, corresponding to the phase P3, transmits the IP addresses of the entities that it has approved in an acknowledgement message M11 of QUIC SIG type to the terminal 2. This QUIC SIG message M11, comprising the IP addresses of the approved processing entities, can be encrypted from parameters, such as encryption keys, negotiated in the messages M7 and M8, so as to guarantee the confidentiality and the authenticity of the message M11. According to one alternative, the transmitted identifiers can be domain names, service names referenced in a DNS server type base or any other type of identifier, depending on the type of information added by the processing entities. The terminal 2 receives the QUIC SIG message M11 in the step E'11 and selects, in the step E12, of the phase P4, the IP addresses of the processing entities 11, 14 that it wants to retain for the session from among the entities approved by the server 21 and transmitted in the message M11. This selection by the terminal 2 can be made on the basis of IP addresses preconfigured in the terminal 2 or by reverse resolution, by obtaining the service or the name associated with the IP address of the processing entity, if the identifier is an IP address. The user of the terminal can, according to one alternative, accept or reject an entity whose name will be indicated to him or her on the screen, for example because it is implemented by an unrecognized or undesirable operator or actor, once the reverse resolution has been performed if the identifier is an IP address, or else, in the absence of resolution, if the identifier of the entity is explicit for a user.

In the step E13, corresponding to the phase P5, the terminal 2 transmits, in an activation message M13 of QUIC type, the data of the session or, more specifically, the packets comprising the data of the session to the server 21. To be sure that the packets take the same path as the message M9, additional routing functions can be used. The message M13 also comprises information making it possible to activate the entities retained by the terminal 2. The message M13 can comprise the identifiers of the selected processing entities, which indicates to the entities whose identifiers are not present, not to activate the process on the data packets of this session. According to one alternative, the message M13 can comprise a session identifier allowing the entities to be able to directly associate a session and, from the identifiers present, an authorization or not to apply a process, from the identifier present or not in the message M13, on the data of the session for which the identifier is in the message M13. According to one alternative, the message M13 can be encrypted by the terminal 2, for example using its private key. The sending of an activation message M13 encrypted by the terminal 2, by using notably a private key, makes it possible to indicate to each entity 11, 14 selected by the terminal 2 that the terminal 2 or the user is indeed the one which has approved said entity 11, 14. That makes it possible to prevent a processing entity from being activated or deactivated by the sending of a message not transmitted by the terminal. The processing entities selected by the terminal 2 for the session can also use the encryption to authenticate the terminal 2 and to apply a specific process according to the terminal 2 which has sent the message, and whose authenticity is guaranteed by the encryption from the private key of the terminal. The processing entities 11, 14 must have the public keys associated with the private key to be able to decrypt the message sent by the terminal 2.

Figure 5:
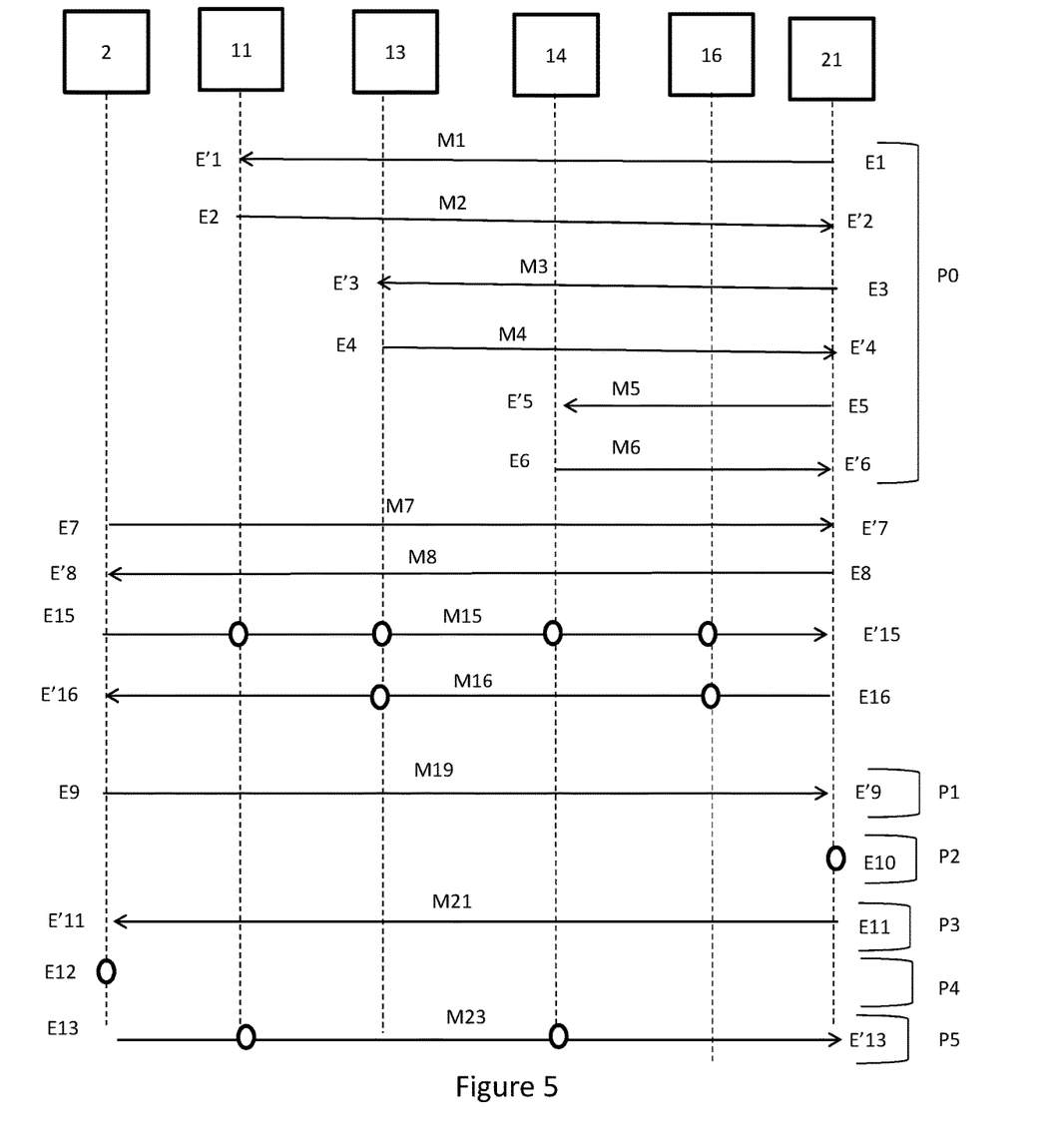
FIG. 5 presents an overview of the steps of the activation method according to a third embodiment of the invention.

Reference is now made to FIG. 5 which presents an overview of the steps of the selection method according to a third embodiment of the invention. In this embodiment, the session between the terminal 2 and the server 21 is set up when the method is implemented and packets of the session have already been exchanged between the terminal 2 and the server 21. In FIG. 4, to recap, the session was being set up and session data had not been exchanged between the terminal 2 and the server 21 in the implementing of the method. Processing entities have already applied a process to the packets of the data session exchanged between the terminal 2 and the server 21.

The steps and the messages in the phase P0 are identical to the steps and messages exchanged in the phase P0 of FIG. 4. It should be noted that this phase P0, for the different embodiments, does not relate to a specific data session and that it is not implemented for each data session in particular. The method can also be implemented in the absence of phase P0. In this case, the server 21 does not perform any selection of processing entities.

In the steps E7, E'7 then E8, E'8, the respective messages M7 and M8 are exchanged between the terminal 2 and the server 21. The messages M7 and M8 are for example TCP session parameter negotiation messages between the terminal 2 and the server 21.

In the step E15, the terminal 2 transmits session data to the server 21. The terminal 2 transmits a message M15 comprising the data of the session. The data of the message M15 have processes applied to them by the respective entities 11, 13, 14, 16. The message M15 is received by the server 21 in the step E'15. The message M15 can for example be an HTTP request message.

The server 21 transmits a message M16 to the terminal 2 in the step E16. The message is for example an HTTP message for sending a content. The data of this message M16 are processed by the processing entities 13 and 16. The message M16 is received by the terminal 2 in the step E'16.

The processing entities apply session processes without having received explicit information, either from the terminal 2, or from the server 21, as to whether or not to apply these processes, compared to what happens in the techniques based on the prior art.

In the step E9, the terminal 2 transmits to the server 21 an identification message M19 based on the TCP protocol to which each processing entity adds an identifier EqID based for example on 24 bits and identifying the processing entity on the path. This message is received by the server 21 in the step E'9.

The step E10 is equivalent to the step E10 of FIG. 4 except that the server 21 uses the identifiers EqID added by each processing entity in the transit of the message M19. In the phase P0, the server 21 will have obtained the identifiers EqID of the processing entities with which an approval has been concluded.

In the step E11, the server 21 transmits a message M21 based also on the TCP protocol and comprising the identifiers EqID of the entities approved by the server 21 from among all of the identifiers received in the message M19. This message is received by the terminal 2 in the step E'11. The message M19 comprises the identifiers EqID of the entities 11, 13, 14.

The step E12 is identical to the step E12 of FIG. 4.

In the step E13, the terminal 2 transmits a message M23 of deactivation of the processing entities not validated by the terminal 2. This deactivation message M23 comprises the identifiers EqID of the entities that do not have to apply process to the data of the session and which must therefore cease their process as applied to the message M15. The message M23 indicates to the entities 13 and 16 to cease their process and then only the processes of the entities 11 and 14 remain on the path. It should be noted that the processing entities, according to one alternative, can confirm that the activation message has been taken into account, and the activation or the deactivation requested, by adding information encrypted with their private key which will be decrypted by the server 21, thus informing the server 21 of the deactivation, in this embodiment, of the entities 13 and 16.

It should be noted that this method can, in its different embodiments, be implemented for each direction of transmission of the data of a session, from the terminal to the server and from the server to the terminal, the processes of the data can be specific to the data transmission direction. According to one alternative, one and the same message can be used to activate the functions for each direction of transmission, information on the direction of transmission allowing the intermediate functions to apply or not apply a processes according to the direction. According to another alternative, an activation message will be transmitted for each transmission direction.

Figure 6:
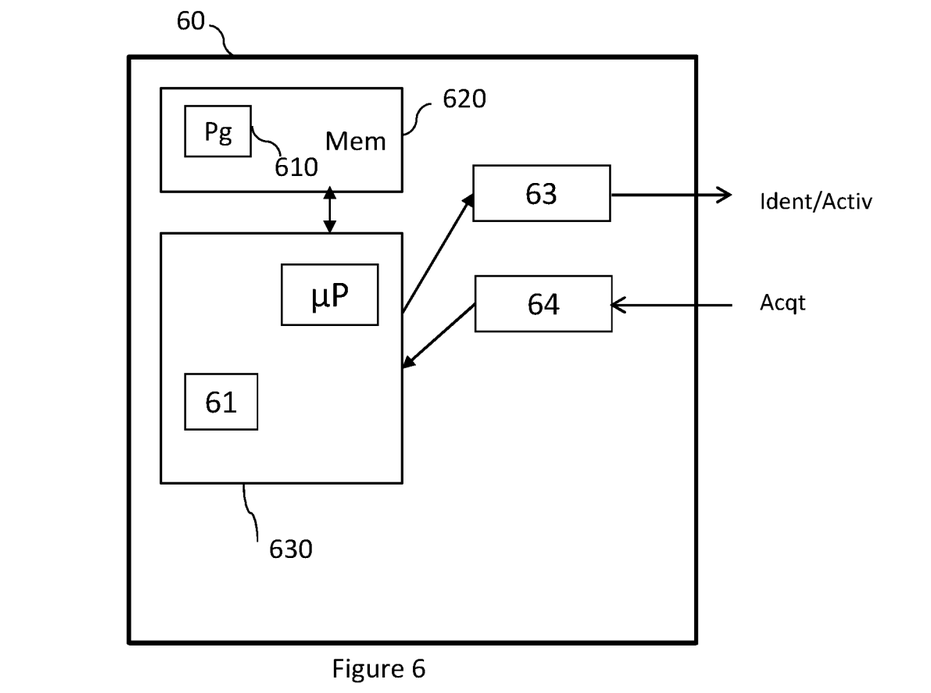
FIG. 6 presents an example structure of an activation device according to an aspect of the invention.

In relation to FIG. 6, an example structure of an activation device is presented according to one aspect of the invention.

The device 60 for activating at least one processing entity from among a plurality of entities implements the activation method, of which different embodiments have just been described.

Such a device 60 can be implemented in a terminal. The terminal can be a mobile terminal or a fixed terminal.

For example, the device 60 comprises a processing unit 630, equipped for example with a microprocessor μP, and driven by a computer program 610, stored in a memory 620 and implementing the activation method according to the invention. On initialization, code instructions of the computer program 610 are for example loaded into a RAM memory, before being executed by the processor of the processing unit 630.

Such a device 60 comprises:
- a transmitter 63, capable of transmitting to the server an identification message Ident intended to receive identifiers of entities of the plurality added by the entities,
- a receiver 64, capable of receiving from the server an acknowledgement message Acqt comprising identifiers included in the identification message,
- a selection module 61, capable of selecting at least one identifier from among those received from the server,
- the transmitter 63, also capable of transmitting to the server a message Activ relating to the activation of entities from among the plurality.

Figure 7:
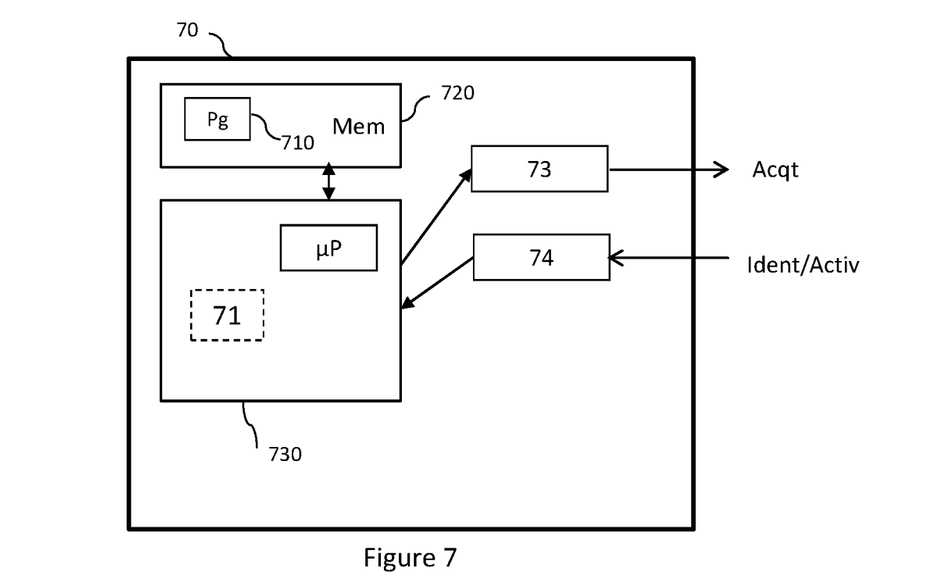
FIG. 7 presents an example structure of an acknowledgement device, according to an aspect of the invention.

In relation to FIG. 7, an example structure of an acknowledgement device is presented, according to one aspect of the invention.

The device 70 for acknowledging at least one processing entity from among a plurality of entities implements the acknowledgement method, of which different embodiments have just been described.

Such a device 70 can be implemented in a server.

For example, the device 70 comprises a processing unit 730, equipped for example with a microprocessor μP, and driven by a computer program 710, stored in a memory 720 and implementing the selection method according to the invention. On initialization, the code instructions of the computer program 710 are for example loaded into a RAM memory, before being executed by the processor of the processing unit 730.

Such a device 70 comprises:
- a receiver 74, capable of receiving an identification message Ident comprising identifiers of entities of the plurality added by these entities,
- a transmitter 73, capable of transmitting to the terminal an acknowledgement message Acqt comprising identifiers included in the identification message,
- the receiver 74, being also capable of receiving from the terminal a message Activ relating to the activation of entities from among the plurality.

The acknowledgement device 70 can also comprise a selection module 71, capable of selecting identifiers of the entities approved by the provider from among the identifiers received in the identification message.

The acknowledgement device 70 can also comprise
- the transmitter 73, capable of transmitting an approval request message to at least one entity of the plurality,
- the receiver 74, capable of receiving an approval response message, from the at least one entity, comprising the public key of the entity.

The modules described in relation to FIG. 6 and FIG. 7 can be hardware or software modules.

The exemplary embodiments of the invention which have just been presented are only a few of the embodiments that can be envisaged. The activation method and the acknowledgement method make it possible to be able advantageously to control the interventions of intermediate functions. The user of a terminal can thus know the processes on his or her data and authorize or not authorize such processes, thus reinforcing the control of the users on the storage, on the modifications and on the use of the data. Through agreements between a services provider and operators, the method also makes it possible to decide which operator transports its data. In fact, multiple-path protocols, the as MTCP (Multipath TCP) are now used to reinforce the availability and quality of service. Each path of a session can comprise distinct entities, possibly implemented by operators that are also distinct. The user, or the terminal if an automatic selection is involved, can select one or more paths according to the processing entities identified on the paths and thus intervene on the policy of routing of the data of a session possibly taking several paths.

The invention claimed is:

1. An activation method for activating at least one processing entity from among a plurality of entities situated on a path of data of a session between a terminal of a user and a content server of a services provider, the content server storing data available for the the terminal, the terminal and the content server being attached to a communication network, wherein activation of the at least one processing entity comprises the following acts implemented in said terminal:
- transmitting to the content server an identification message to receive identifiers of the plurality of entities, which are added to the identification message by the plurality of entities,
- receiving from the content server an acknowledgement message comprising identifiers from among the identifiers included in the identification message,
- selecting at least one identifier from among the identifiers received from the content server,
- transmitting to the content server a message relating to the activation of the at least one processing entity for the session on from among the plurality of entities, which corresponds to the at least one selected identifier.

2. The activation method, as claimed in claim 1, in which the acknowledgement message comprises the identifiers of the plurality of entities approved by the services provider.

3. The activation method, as claimed in claim 1, in which the message relating to the activation comprises information for deactivating entities of the plurality of entities whose identifiers are not selected by the terminal.

4. The activation method, as claimed in claim 1, in which the message relating to the activation comprises information for activating entities of the plurality of entities whose identifiers are selected by the terminal.

5. The activation method, as claimed in claim 1, in which the identification message and the message relating to the activation are messages relating to QUIC (Quick UDP Internet Connections) protocol.

6. The activation method, as claimed in claim 1, in which the identification message and the message relating to the activation also comprise a session identifier.

7. An acknowledgement method for acknowledging identification of at least one processing entity from among a plurality of entities situated on a path of data of a session between a terminal of a user and a content server of a services provider, the content server storing data available terminal, the terminal and the content server being attached to a communication network, wherein the acknowledgement method comprises the following acts implemented in said content server:
- receiving from the terminal an identification message comprising identifiers of the plurality of entities, which are added to the identification message by the plurality of entities,
- transmitting to the terminal an acknowledgement message comprising identifiers from among the identifiers included in the identification message, and
- receiving from the terminal a message relating to activation of the at least one processing entity from among the plurality of entities, which corresponds to at least one selected identifier from among the identifiers included in the acknowledgement message.

8. The acknowledgement method, as claimed in claim 7, further comprising selecting the identifiers of entities of the plurality of entities that are approved by the services provider from among the identifiers received in the identification message.

9. The acknowledgment method, as claimed in claim 7, further comprising:
transmitting an approval request message to the at least one processing entity of the plurality of entities,
receiving an approval response message, from the at least one processing entity, comprising a public key of the at least one processing entity.

10. A device for activating at least one processing entity from among a plurality of entities situated on a path of data of a session between a terminal of a user and a content server of a services provider, the content server storing data available for the terminal, the terminal and the content server being attached to a communication network, wherein the device is implemented in said terminal and comprises:
a transmitter;
a receiver;
a processor; and
a non-transitory computer-readable medium comprising instructions stored thereon which when executed by the processor configure the device to:
use the transmitter to transmit to the content server an identification message to receive identifiers of the plurality of entities, which are added to the identification message by the plurality of entities,
use the receiver to receive from the content server an acknowledgement message comprising identifiers from among the identifiers included in the identification message,
select at least one identifier from among the identifiers received from the content server, and
use the transmitter to transmit to the content server a message relating to activation of the at least one processing entity for the session from among the plurality of entities, which corresponds to the at least one identifier.

11. An acknowledgement device for acknowledging identification of at least one processing entity from among a plurality of entities situated on a path of data of a session between a terminal of a user and a content server of a services provider, the content server storing data available for the terminal, the terminal and the content server being attached to a communication network, wherein the acknowledgement device is implemented in said content server and comprises:
a transmitter;
a receiver;
a processor; and
a non-transitory computer-readable medium comprising instructions stored thereon which when executed by the processor configure the acknowledgement device to:
receive from the terminal an identification message comprising identifiers of the plurality of entities, which are added to the identification message by the plurality of entities,
transmit to the terminal an acknowledgement message comprising identifiers from among the identifiers included in the identification message, and
receive a message relating to activation of the at least one processing entity for the session from among the plurality of entities, which corresponds to at least one selected identifier from among the identifiers included in the acknowledgement message.

12. The acknowledgement device, as claimed in claim 11, wherein the acknowledgement device is further configured to select identifiers of the plurality of entities that are approved by the services provider from among the identifiers received in the identification message.

13. A system for activating at least one intermediate function, comprising:
a terminal comprising an activation device, for activating at least one processing entity from among a plurality of entities situated on a path of data of a session between the terminal of a user and a content server of a services provider, the content server storing data available for the terminal, the terminal and the content server being attached to a communication network, wherein the activation device comprises:
a transmitter;
a receiver;
a processor; and
a non-transitory computer-readable medium comprising instructions stored thereon which when executed by the processor configure the activation device to:
use the transmitter to transmit to the content server an identification message to receive identifiers of the plurality of entities, which are added to the identification message by the plurality of entities,
use the receiver to receive from the content server an acknowledgement message comprising identifiers from among the identifiers added to the identification message,
select at least one identifier from among the identifiers received from the content server, and
use the transmitter to transmit to the content server a message relating to activation of the at least one processing entity for the session from among the plurality of entities, which corresponds to the at least one selected identifier,
the at least one processing entity of the plurality of entities, which is configured to add the identifier of the at least one processing entity to the identification message received from the terminal, and is configured to activate a process relating to the identification message.

14. A non-transitory computer-readable storage medium on which is stored a computer program comprising instructions which when executed by a processor of a terminal of a user configure the terminal to perform acts comprising:
activating at least one processing entity from among a plurality of entities situated on a path of data of a session between the terminal and a content server of a services provider, the content server storing data available for the terminal, the terminal and the content server being attached to a communication network, wherein the activating comprises:
transmitting to the content server an identification message to receive identifiers of the plurality of entities, which are added to the identification message by the plurality of entities,
receiving from the content server an acknowledgement message comprising identifiers from among the identifiers included in the identification message,
selecting at least one identifier from among the identifiers received from the content server,
transmitting to the content server a message relating to the activation of the at least one processing entity for the session from among the plurality of entities, which corresponds to the at least one selected identifier.

\* \* \* \* \*